United States Patent
Watts et al.

(10) Patent No.: US 10,421,657 B2
(45) Date of Patent: Sep. 24, 2019

(54) REDUCED BOIL-OFF THERMAL CONDITIONING SYSTEM

(71) Applicant: THE BOEING COMPANY, Chicago, IL (US)

(72) Inventors: Daniel A. Watts, Surfside, CA (US); David S. Jenkins, Huntington Beach, CA (US); Albert Olsen, Chicago, IL (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 15/208,564

(22) Filed: Jul. 12, 2016

(65) Prior Publication Data

US 2018/0016130 A1     Jan. 18, 2018

(51) Int. Cl.
     *B67D 7/32*      (2010.01)
     *F17C 7/04*      (2006.01)
     (Continued)

(52) U.S. Cl.
CPC ......... *B67D 7/3245* (2013.01); *B67D 7/0476* (2013.01); *F17C 6/00* (2013.01); *F17C 7/04* (2013.01); *F17C 9/00* (2013.01); *F17C 2201/0109* (2013.01); *F17C 2201/035* (2013.01); *F17C 2201/054* (2013.01); *F17C 2201/056* (2013.01); *F17C 2203/0366* (2013.01); *F17C 2203/0387* (2013.01); *F17C 2203/0629* (2013.01); *F17C 2205/0111* (2013.01); *F17C 2205/037* (2013.01); *F17C 2205/0332* (2013.01); *F17C 2205/0367* (2013.01); *F17C 2221/011* (2013.01); *F17C 2221/012* (2013.01); *F17C 2221/013* (2013.01); *F17C 2221/014* (2013.01); *F17C 2221/016* (2013.01); *F17C 2221/017* (2013.01); *F17C 2221/033* (2013.01); *F17C 2223/0161* (2013.01); *F17C 2223/0169* (2013.01); *F17C 2223/035* (2013.01); *F17C 2223/046* (2013.01); *F17C 2225/0161* (2013.01);

(Continued)

(58) Field of Classification Search
CPC ...... F17C 7/04; F17C 6/00; F17C 9/00; F17C 2203/0629; F17C 2203/0366; F17C 2260/035; F17C 2250/0631; F17C 2265/061; F17C 2227/0164; F17C 2250/01; F17C 2227/0339; F17C 2227/0383; F17C 2227/0386; B67D 7/0476; B67D 7/3245
See application file for complete search history.

(56) References Cited

U.S. PATENT DOCUMENTS

| | | | |
|---|---|---|---|
| 4,332,136 A * | 6/1982 | Quack | F25B 25/00 220/749 |
| 2014/0174106 A1 * | 6/2014 | Tang | F17C 7/04 62/50.2 |

* cited by examiner

*Primary Examiner* — Keith M Raymond
*Assistant Examiner* — Webeshet Mengesha
(74) *Attorney, Agent, or Firm* — Toler Law Group, PC (57) ABSTRACT

A Reduced Boil-off Thermal Conditioning System ("RBTC System") for transferring liquid natural gas ("LNG") from a LNG supply tank to a LNG storage tank with reduced boil-off is disclosed. The RBTC System includes the LNG storage tank, a cryogenic fluid tank within the LNG supply tank, and a compressor. The LNG storage tank includes a first and second LNG pipe. The cryogenic fluid tank is configured to store a cryogenic fluid within the cryogenic fluid tank and the first and second LNG pipe are in fluid communication with to the cryogenic fluid tank. The first LNG pipe is in fluid communication with compressor.

20 Claims, 6 Drawing Sheets

(51) Int. Cl.
*F17C 6/00* (2006.01)
*B67D 7/04* (2010.01)
*F17C 9/00* (2006.01)

(52) U.S. Cl.
CPC .. *F17C 2225/033* (2013.01); *F17C 2225/046* (2013.01); *F17C 2227/0107* (2013.01); *F17C 2227/0164* (2013.01); *F17C 2227/036* (2013.01); *F17C 2227/0339* (2013.01); *F17C 2227/0383* (2013.01); *F17C 2227/0386* (2013.01); *F17C 2250/0439* (2013.01); *F17C 2250/0491* (2013.01); *F17C 2250/0631* (2013.01); *F17C 2260/035* (2013.01); *F17C 2265/037* (2013.01); *F17C 2265/061* (2013.01); *F17C 2265/065* (2013.01); *F17C 2270/0105* (2013.01); *F17C 2270/0168* (2013.01); *F17C 2270/0171* (2013.01); *F17C 2270/0176* (2013.01); *F17C 2270/0189* (2013.01)

REDUCED BOIL-OFF THERMAL CONDITIONING SYSTEM

BACKGROUND

1. Field

The present disclosure relates to natural gas systems, and more, particularly to a system and processes for filling natural gas storage tanks.

2. Related Art

In today's modern society there has been a growing option of utilizing liquid natural gas ("LNG") as fuel. In general, LNG is an attractive fuel for vehicles such as, for example, automobiles, trucks, and buses, aircraft, boats, and maritime vessels due to the low cost of LNG.

A major drawback to LNG, however, is that LNG is a cryogenic fluid and more importantly a very strong greenhouse gas. As such, LNG, as a cryogenic fluid, has a boiling point of approximately −162° C. that is well below the normal environmental ambient temperatures on Earth and any vented (i.e., released) LNG into the environment will quickly boil-off into gaseous natural gas ("GNG") that will dissipate into the atmosphere as a strong greenhouse gas. This is a problem because in order to properly fill a LNG storage tank with LNG, the LNG storage tank (which is a cryogenic tank) must first be pre-chilled to a temperature that is approximately equal to the temperature of the LNG that is being used to fill the LNG storage tank. A problem with many known techniques to pre-chill the LNG storage tank include filling the LNG storage tank with cold LNG and then venting the LNG to the atmosphere to chill the LNG storage tank. Since LNG is a strong greenhouse gas, the known techniques are very undesirable to the environment and additionally by venting the LNG directly to the atmosphere, the system experiences a significant loss in potential work or potential energy. As such, there is a need for a pre-chill system for use in reducing boil-off of LNG when filling an LNG storage tank that overcomes the problems of the prior art.

SUMMARY

Disclosed is a Reduced Boil-off Thermal Conditioning ("RBTC") System for transferring liquid natural gas ("LNG" also known as "liquefied natural gas") from a LNG supply tank to a LNG storage tank with reduced boil-off. The RBTC System includes a cryogenic fluid tank within the LNG supply tank, a compressor, and a throttling device. The LNG storage tank includes a first LNG pipe and a second LNG pipe. The cryogenic fluid tank is configured to store a cryogenic fluid within the cryogenic fluid tank and the first LNG pipe and the second LNG pipe are in fluid communication with the cryogenic fluid tank. The compressor is in fluid communication with both the cryogenic fluid tank and the first LNG pipe and the throttling device is in fluid communication with both the cryogenic fluid tank and the second LNG pipe.

In an example of operation, the RBTC System performs a method for reducing Boil-off of LNG while transferring the LNG from the LNG supply tank to the LNG storage tank. The method includes: passing a cryogenic fluid within the cryogenic fluid tank to the LNG storage tank; cooling the LNG storage tank to a temperature equal to or below a temperature of LNG within the LNG supply tank; and passing the LNG from the LNG supply tank to the LNG storage tank.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The present disclosure may be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

A Reduced Boil-off Thermal Conditioning ("RBTC") System for transferring liquid natural gas ("LNG" also known as "liquefied natural gas") from a LNG supply tank to a LNG storage tank with reduced boil-off is disclosed. The RBTC System includes a cryogenic fluid tank within the LNG supply tank, a compressor, and a throttling device. The LNG storage tank includes a first LNG pipe and a second LNG pipe. The cryogenic fluid tank is configured to store a cryogenic fluid within the cryogenic fluid tank and the first LNG pipe and the second LNG pipe are in fluid communication with the cryogenic fluid tank. The compressor is in fluid communication with both the cryogenic fluid tank and the first LNG pipe and the throttling device is in fluid communication with both the cryogenic fluid tank and the second LNG pipe.

In an example of operation, the RBTC System performs a method for reducing Boil-off of LNG while transferring the LNG from the LNG supply tank to the LNG storage tank. The method includes: passing a cryogenic fluid within the cryogenic fluid tank to the LNG storage tank; cooling the LNG storage tank to a temperature equal to or below a temperature of LNG within the LNG supply tank; and passing the LNG from the LNG supply tank to the LNG storage tank.

In this disclosure it is appreciated by those of ordinary skill in the art that a cryogenic fluid is a liquefied gas (sometime referred to as a "compressed gas"), cryogenic gas, or both (i.e., if the cryogenic fluid is saturated) that is kept at a very low temperature that typically has a boiling point below approximately −130° C. Examples of cryogenic fluids include Nitrogen gas ("$N_2$"), Carbon Dioxide gas ("$CO_2$"), Nitrous Oxide gas ("$N_2O$"), Argon gas ("Ar"), Helium gas ("He"), Hydrogen gas ("$H_2$"), Oxygen gas ("$O_2$"), Methane ("$CH_4$"), etc. For purposes of simplicity, in this disclosure the cryogenic fluid is chosen to be gaseous Nitrogen ("$GN_2$") and the cryogenic tank is chosen to be a $GN_2$ tank. However, it is appreciated by those of ordinary skill in the art that other cryogenic gas (such as, for example, Argon, Helium, etc.) could also be utilized without departing from the spirit of this disclosure.

Figure 1:
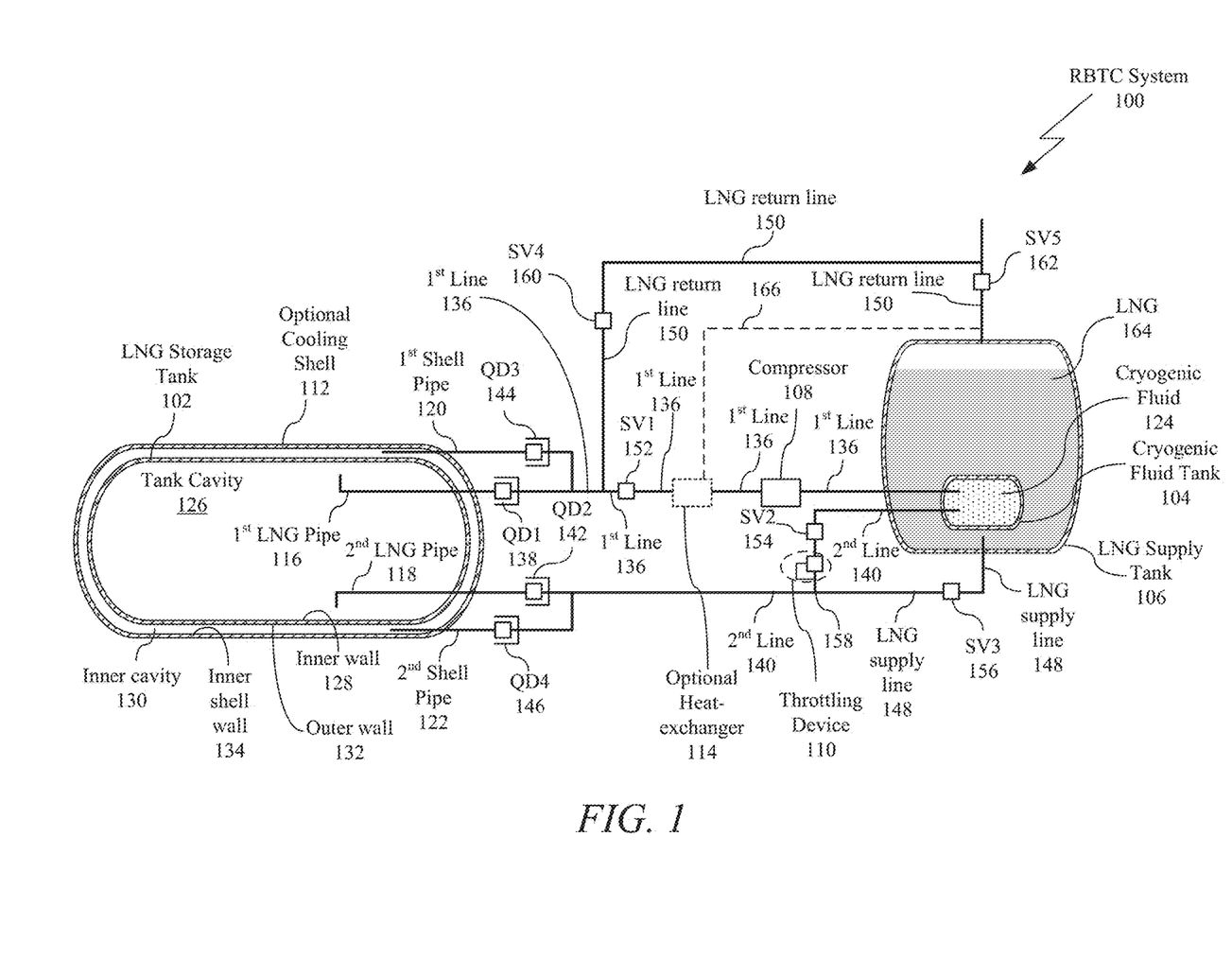
FIG. 1 is a system block diagram of an example of an implementation of a Reduced Boil-off Thermal Conditioning ("RBTC") System in accordance with the present disclosure.

In FIG. 1, a system block diagram is shown of an example of an implementation of the RBTC System 100. As described earlier, the RBTC System 100 includes a LNG storage tank 102, a cryogenic fluid tank 104 within a LNG supply tank 106, a compressor 108, and a throttling device 110. The RBTC system 100 may also include an optional cooling shell 112 surrounding the LNG storage tank 102 and an optional heat-exchanger 114. The LNG storage tank 102 includes a first LNG pipe 116 and a second LNG pipe 118 and the optional cooling shell 112 includes a first shell pipe 120 and second shell pipe 122. The cryogenic fluid tank 104 is configured to store a cryogenic fluid 124 within the cryogenic fluid tank 104. For purposes of simplicity, in this disclosure the cryogenic fluid 124 is chosen to be $GN_2$ and the cryogenic fluid tank 104 is chosen to be a $GN_2$ tank. However, it is appreciated by those of ordinary skill in the art that other cryogenic gases (such as, for example, Argon, Helium, etc.) could also be utilized without departing from the spirit of this disclosure.

In this example, the first LNG pipe 116 and the second LNG pipe 118 are in fluid communication with the cryogenic fluid tank 104. The first LNG pipe 116 is also in fluid communication with the compressor 108 and the first shell pipe 120. The second LNG pipe 118 is also in fluid communication with the second shell pipe 122. Both the first and second LNG pipes 116 and 118 are in fluid communication with a tank cavity 126 that is defined by an inner wall 128 of the LNG storage tank 102. Similarly, both the first and second shell pipes 120 and 122 are in fluid communication with an inner cavity 130 that is defined by an outer wall 132 of the LNG storage tank 102 and an inner shell wall 134 of the optional cooling shell 112. Moreover, the first and second LNG pipes 116 and 118 are also in fluid communication with the LNG supply tank 106. Furthermore, the first LNG pipe 116 is in fluid communication with a first line 136 via a first connection that may be, for example, a first quick disconnect fitting ("QD1") 138, the second LNG pipe 118 is in fluid communication with a second line 140 via a second connection that may be, for example, a second quick disconnect fitting ("QD2") 142, the first shell pipe 120 is in fluid communication with the first line 136 via a third connection that may be, for example, a third quick disconnect fitting ("QD3") 144, and the second shell pipe 122 is in fluid communication with the second line 140 via a fourth connection that may be, for example, a fourth quick disconnect fitting ("QD4") 146.

The first line 136 is in fluid communication with the cryogenic fluid tank 104 and is a first fluid path between the cryogenic fluid tank 104 and both the LNG storage tank 102 and the optional cooling shell 112. In this example, the first fluid path (i.e., first line 136) also includes the compressor 108 and the optional heat-exchanger 114. The second line 140 is also in fluid communication with the cryogenic fluid tank 104 and is a second fluid path between the cryogenic fluid tank 104 and both the LNG storage tank 102 and the optional cooling shell 112. In this example, the second fluid path also includes the throttling device 110.

In this example, the second line 140 also includes a LNG supply line 148 that is in fluid communication with both the second line 140 (after the throttling device 110 in the fluid direction of the LNG storage tank 102) and the LNG supply tank 106. The first line 136 also includes a LNG return line 150 that is in fluid communication with both the first line 136 (after the compressor 108 (in the fluid direction of the LNG storage tank 102) and before QD1 138 and QD3 144) and the LNG supply tank 106. In this example, the LNG return line 150 fluidly connects to the first line 136 before the optional heat-exchanger 114; however, if the system does not include the optional heat-exchanger 114, the LNG return line 150 fluidly connects to the first line 136 before the compressor 108. Additionally, the first line 136 may include a first shutoff valve ("SV1") 152 before the compressor 108 and the optional heat-exchanger 114 (in the fluid direction of the LNG storage tank 102) and the second line 140 may include a second shutoff valve ("SV2") 154 after the LNG supply tank 106 and before the throttling device 110. Furthermore, the LNG supply line 148 may include a third shutoff valve ("SV3") 156 after the LNG supply tank 106 and before the fluid connection 158 after the throttling device 110 on the second line 140. The LNG return line 150 may include a fourth shutoff valve ("SV4") 160 after QD1 138 and QD3 144 (and before SV1 152) and before the LNG supply tank 106. Moreover, the LNG return line 150 may also include a fifth shutoff valve ("SV5") 162 after SV4 160 and before the LNG supply tank 106. In this example, the LNG supply tank 106 is assumed to be full of LNG 164.

In this example, the first LNG pipe 116 and first shell pipe 120 act as vents since they allow fluids within the tank cavity 126 and inner cavity 130 to escape the LNG storage tank 102 and optional cooling shell 112. Additionally, the compressor 108 is a fluid compressor which is a mechanical device that increases the pressure of a fluid by reducing its volume. Examples of fluid compressor may include positive displacement compressors (such as, for example, a reciprocating compressor), dynamic compressors, and heretically sealed, open or semi-hermetic compressors. In this example the compressor 108 may a reciprocating compressor such as a diaphragm compressor. The throttling device 110 may be a throttling value (i.e., a thermal expansion valve), regulator, or other device that causes flash (or partial) evaporation and/or cooling of a fluid through pressure reduction. Examples of the shutoff valves SV1 152, SV2 154, SV3 156, SV4 160, and SV5 162 may include a cryogenic isolation valve such as, for example, globe, gate, ball, and butterfly cryogenic isolation valves. An example of the throttling device 110 may include a cryogenic fluid pressure reducer, piston type, single state pressure valve operating from approximately 2 bar to about 9.3 bar of pressure levels having an inlet pressure of about 7 bar to 11 bar ABS and a gas flow rate of about 77 Kg/h. In general, the throttling device 110 allows the LNG 164 to be gas throttled by causing a reduction of pressure in the LNG 164 flow through the throttling device 110 which acts a local hydrodynamic resistance point so as to cause a drop in temperature of the LNG 164. As such, the throttling device 110 is configured to lower the pressure of LNG 164 flowing through the throttling device 110 so as to reduce the temperature of the LNG 164 passing through the throttling device 110 (in the direction of the LNG storage tank 102) to a temperature that is below the temperature of the LNG 164 within the LNG supply tank 106.

Furthermore, in this example, while the optional cooling shell 112 is not required as a part of the RBTC System 100, the optional cooling shell 112 assists in reducing or eliminating the boil-off during storage of the LNG 164 within the tank cavity 126 and decreases the loading times for storing the LNG 164 within the tank cavity 126. As such, in this disclosure the examples will include the optional cooling shell 112, while it is noted that RBTC System 100 will still operate without the optional cooling shell 112. Moreover, in this example, while the optional heat-exchanger 114 is also not required as part of the RBTC System 100, the optional heat-exchanger 114 is a device that transfers heat between one or more fluids. The fluids may be separated by a solid wall to prevent mixing or they be in direct contact. Specifically in this example, the optional heat-exchanger 114 may be utilized to transfer heat between the cryogenic fluid 124 and the LNG 164 via optional fluid path 166. In operation, the optional heat-exchanger 114 cools the returning cryogenic fluid 124 (i.e., GN2) that is returning to the cryogenic fluid tank 104, which removes heat from the cryogenic fluid 124. The removed heat may be added to the returning LNG 164 or, if a vent line regulator is present (described in FIG. 3), the heat may be utilized for another purpose outside the RBTC System 100.

It is appreciated by those of ordinary skill in the art that the phrase fluid communication is being utilized in this disclosure to describe a way of providing a fluid flow within a fluid path between a first position and a second position that are separated by a distance. In fluid path may be any path that allows the fluid to flow from the first position to the second position and may include, for example, tubes, tubing, hoses, lines, conduits, channels, canals, ducts, vessels, cylinders, pipes, pipelines, chambers, fluid devices, fluid components, fluid connections, fluid couplings, valves, taps, spigots, regulators, etc.

As disclosed, the RBTC System 100 is a closed loop recirculation system that is configured to pre-chill and maintain a chill of the LNG storage tank 102 such that it reduces boil-off of the LNG 164 and, therefore, does not require the venting of large quantities of gaseous natural gas ("GNG") from the LNG storage tank 102 into the atmosphere. Additionally, in operation, the RBTC System 100 also maintains the LNG 164 at high pressure within the LNG supply tank 106.

In general, as a closed system, the first LNG pipe 116, second LNG pipe 118, first line 136, second line 140, optional heat-exchanger 114, compressor 108, throttling device 110, SV1 152, and SV2 154 are configured such that in operation the cryogenic fluid 124, from the cryogenic fluid tank 104, leaves the cryogenic fluid tank 104, via the second line 140, passes through SV2 154 and the throttling device 110 and enters the tank cavity 126 through the second LNG pipe 118 and leaves the tank cavity 126, via the first LNG pipe 116, and returns to the cryogenic fluid tank 104 via the first line 136, SV1 152, optional heat-exchanger 114, and the compressor 108. The compressor 108 compresses the cryogenic fluid 124 (returning via the first line 136) to a higher pressure value and forces it into the cryogenic fluid tank 104.

Similarly, if the optional cooling shell 112 is present, the first shell pipe 120, second shell pipe 122, first line 136, second line 140, optional heat-exchanger 114, and compressor 108, throttling device 110, SV1 152, and SV2 154 are configured such that in operation the cryogenic fluid 124, from the cryogenic fluid tank 104, leaves the cryogenic fluid tank 104, via the second line 140, passes through SV2 154 and the throttling device 110 and enters the inner cavity 130 of the optional cooling shell 112 through the second shell pipe 122 and leaves the inner cavity 130, via the first shell pipe 120, and returns to the cryogenic fluid tank 104 via the first line 136, the optional heat-exchanger 114, and the compressor 108. The compressor 108 compresses the cryogenic fluid 124 (returning via the first line 136) to a higher pressure value and forces it into the cryogenic fluid tank 104.

As an example of operation of the RBTC System 100, both the LNG storage tank 102 and optional cooling shell 112 are first cooled down by the cryogenic fluid 124 from the cryogenic fluid tank 104 to a temperature that is equal to or less than the temperature of the LNG 164 within the LNG supply tank 106. Once the temperature of the LNG storage tank 102 is at a temperature that is equal to or less than the temperature of the LNG 164 within the LNG supply tank 106, the RBTC System 100 then removes and/or vents the cryogenic fluid 124 within the tank cavity 126 of the LNG storage tank 102 and begins filling the tank cavity 126 with the LNG 164 from the LNG supply tank 106 while optionally maintaining the cryogenic fluid 124 within the inner cavity 130 of the optional cooling shell 112.

In this example of operation, the cryogenic fluid 124 leaving the cryogenic fluid tank 104 begins to heat up (i.e., increase in temperature) as it leaves the cryogenic fluid tank 104 because of the conduction of heat from the surface areas of the second line 140, second LNG pipe 118, second shell pipe 122, inner cavity walls (i.e., the outer wall 132 of the LNG storage tank 102 and inner shell wall 134 of the optional cooling shell 112), inner wall 128 of the LNG storage tank 102, first LNG pipe 116, first shell pipe 120, and first line 136, SV1 152, and the compressor 108. As such, when the cryogenic fluid 124 returns to the cryogenic fluid tank 104 in the closed system, the returning cryogenic fluid 124 will be at a higher temperature than the original temperature of the cryogenic fluid 124 leaving the cryogenic fluid tank 104, which may result in the temperature of the cryogenic fluid tank 104 increasing to a temperature that is higher than the temperature of LNG 164 within the LNG supply tank 106. This resulting increase in temperature of the cryogenic fluid tank 104 is transferred to the LNG 164 via heat conduction through the walls of the cryogenic fluid tank 104 to LNG 164 within the LNG supply tank 106 as the cryogenic fluid 124 and cryogenic fluid tank 104 both cool back down by releasing the accumulated heat to the LNG 164. The resulting conducted heat from the cryogenic fluid tank 104 raises the temperature of the LNG 164, which increases the LNG 164 pressure within the LNG supply tank 106. If the optional heat-exchanger 114 is present and in fluid communication with the first line 136 (either upstream or downstream of the compressor 108), the optional heat-exchanger 114 will remove heat from the cryogenic fluid 124 returning to the cryogenic fluid tank 104.

As such, using this approach, the tank cavity 126 may be filled with LNG 164 from the LNG supply tank 106 with little or no boil-off because the second line 140, second LNG pipe 118, and tank cavity 126 are a temperature that is at or below the temperature of the LNG 164 within the LNG supply tank 106. Additionally, the LNG 164 pressure may be maintained high enough to properly fill the tank cavity 126 without utilizing external pressurization devices. Once the tank cavity 126 is filled with LNG 164, the RBTC System 100 may continue to circulate the cryogenic fluid 124 within the inner cavity 130, of the optional cooling shell 112, and the cryogenic fluid tank 104 so as to keep the LNG storage tank 102 at a low temperature that may be approximately the temperature of the LNG 164 within the LNG supply tank 106 or lower where the general temperature for LNG 164 is approximately −162° C. with a pressure less than about 4 psi.

Figure 2:
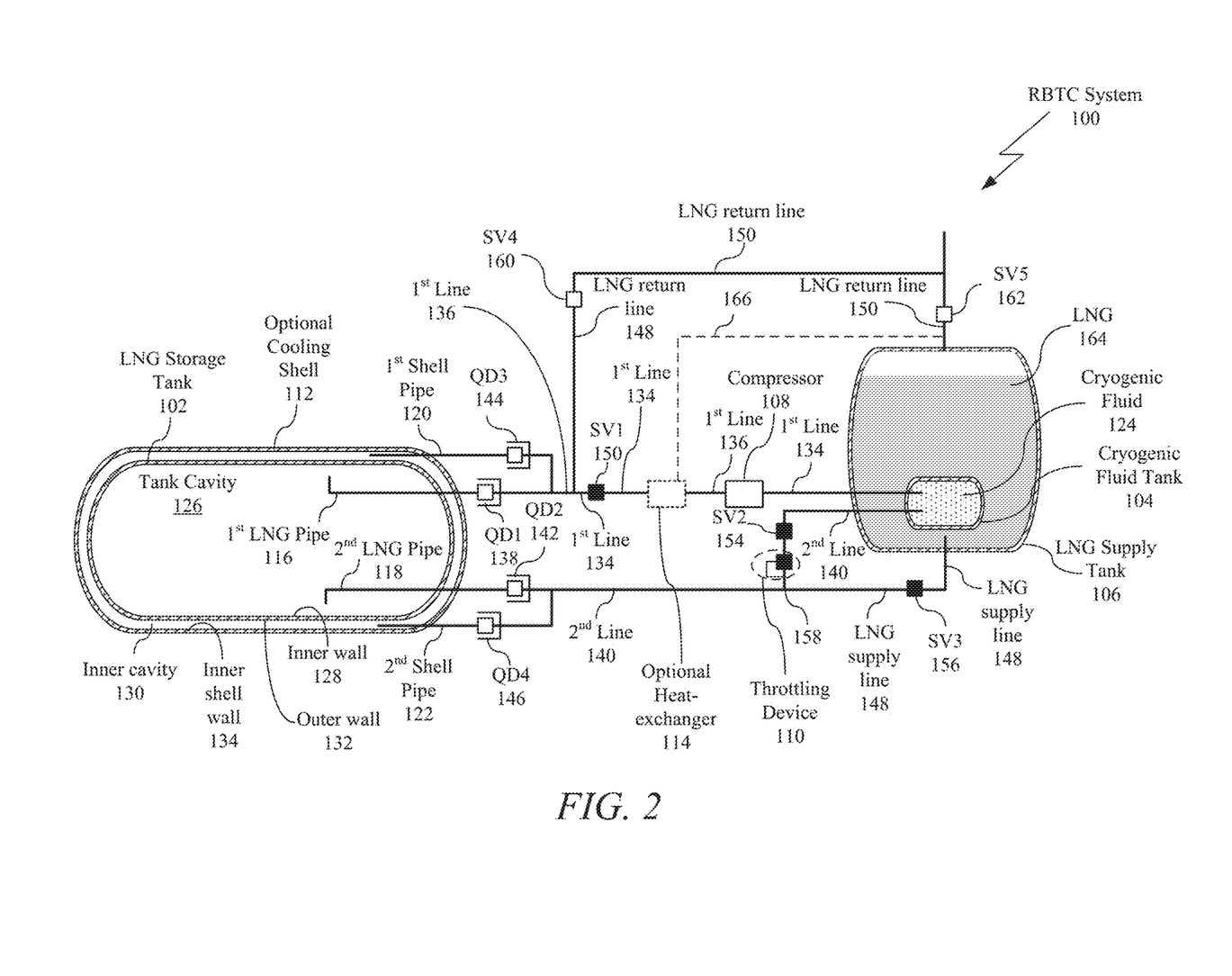
FIG. 2 is a system block diagram showing an example of an implementation of the RBTC System, shown in FIG. 1, while in operation in accordance with the present disclosure.

As an example of operation, in FIG. 2, a system block diagram is shown of an example of the implementation of the RBTC System 100, shown in FIG. 1, while in operation. In this example, the SV1 152, SV2 154, SV3 156, and the throttling device 110 are shown in the off position (i.e., they are shown in dark in the figure). This example describes the situation when the LNG storage tank 102 is first connected to the rest of the RBTC System 100 by connecting QD1 138, QD2 142, QD3 144, and QD4 146 to the first line 136 and second line 140, respectively. In this example, SV1 152, SV2 154, SV3 156, and the throttling device 110 are in the off position to prevent gas from escaping either the LNG supply tank 106 or the cryogenic fluid tank 104. Additionally, SV4 160 is shown in an open position to prevent pressure from building up in the RBTC System 100 (and LNG storage tank 102 in particular) when not in operation. Moreover, the pressure and temperature of the LNG storage tank 102 are at ambient pressure and temperature that may vary somewhat based on the ambient environmental conditions but will nonetheless be much lower in pressure and higher in temperature than the corresponding pressure and temperature of the cryogenic fluid 124 within the cryogenic fluid tank 104.

Figure 3:
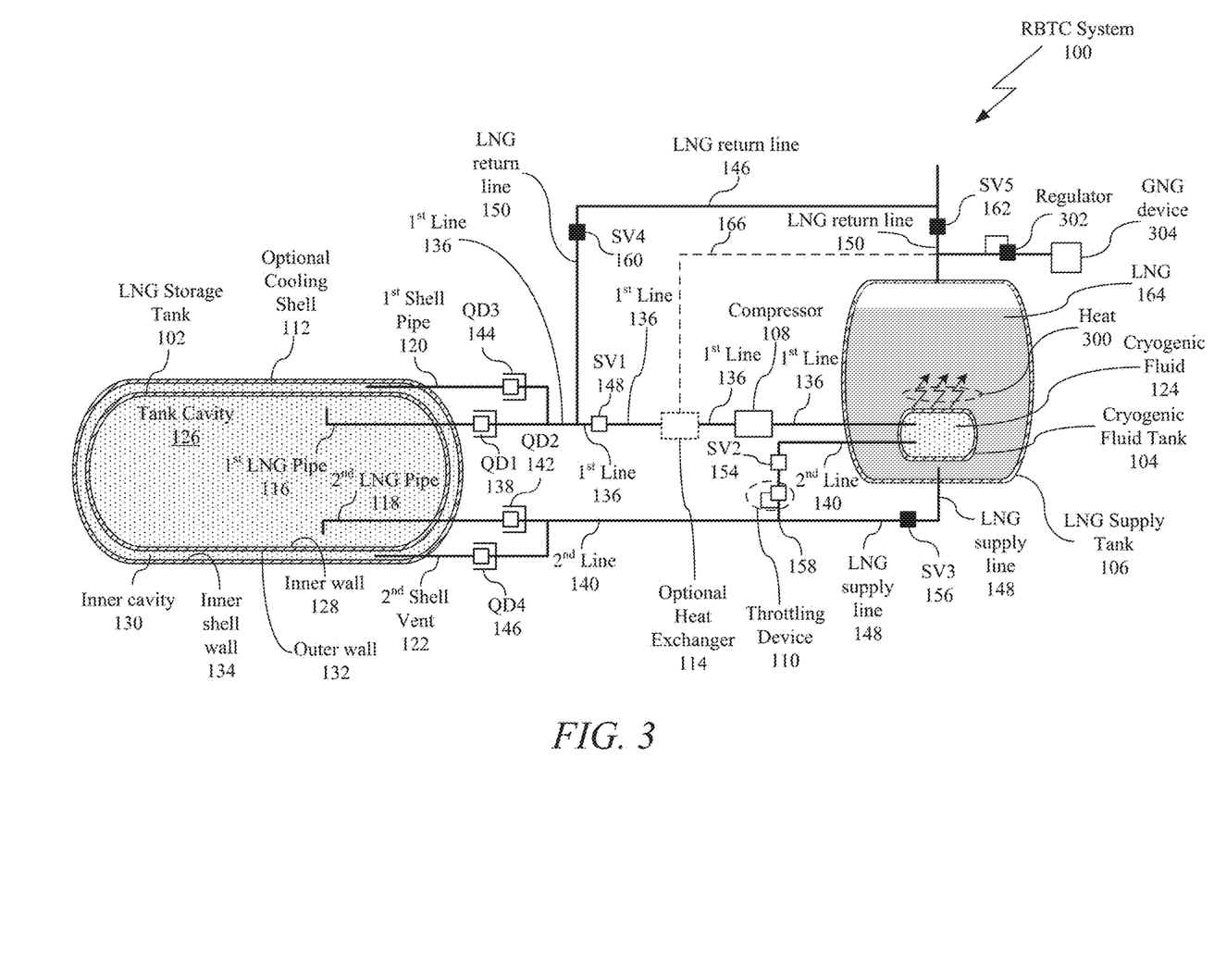
FIG. 3 is a system block diagram of another example of an implementation of the RBTC System, shown in FIGS. 1 and 2, while in operation in accordance with the present disclosure.

Turning to FIG. 3, in FIG. 3, a system block diagram is shown of another example of an implementation of the RBTC System 100, shown in FIGS. 1 and 2, while in operation. In this example, SV4 160 is closed and SV1 152, SV2 154, and the throttling device 110 is turned to the open position.

As a result, the cryogenic fluid 124 is released from the cryogenic fluid tank 104 and passed to both the tank cavity 126 of the LNG storage tank 102 and the inner cavity 130 of the optional cooling shell 112 via the second line 140, SV2 154, throttling device 110, second LNG pipe 118, and second shell pipe 122. The cryogenic fluid 124 then leaves the tank cavity 126 and inner cavity 130 of the optional cooling shell 112 via the first LNG pipe 116, first shell pipe 120, and first line 136 to SV1 152 that passes the cryogenic fluid 124 to the compressor 108. The compressor 108 then compresses the received cryogenic fluid 124 from the LNG storage tank 102 and the optional cooling shell 112 and forces the compressed cryogenic fluid 124 through the first line 136 and back to the cryogenic fluid tank 104. If the optional heat-exchanger 114 is present, the optional heat-exchanger 114 removes heat from the cryogenic fluid 124 prior to returning to the cryogenic fluid tank 104.

Since the cryogenic fluid 124 is $GN_2$ with a boiling point of approximately −195.795° C., it is very cold and will quickly reduce the temperature of the second line 140, tank cavity 126, and inner cavity 130 well below the original ambient temperature to close to the temperature of the cryogenic fluid 124 which is lower than the approximate −162° C. temperature of LNG 164. The returning cryogenic fluid 124 from the tank cavity 126 and inner cavity 130 will also cool the first LNG pipe 116, first shell pipe 120, and first line 136 to close to the temperature of the cryogenic fluid 124. However, as noted earlier, once the cryogenic fluid 124 returns to the cryogenic fluid tank 104, the returning cryogenic fluid 124 is at a higher temperature than the original cryogenic fluid 124 that initially left the cryogenic fluid tank 104. This results in raising the temperature of the remaining cryogenic fluid 124 within the cryogenic fluid tank 104 and, thus, also correspondingly raising the temperature of the cryogenic fluid tank 104. This added heat 300 is thermally conducted (i.e., transferred) to the LNG 164 within the LNG supply tank 106 through the walls (i.e., skin) of the cryogenic fluid tank 104. The heat 300 from the cryogenic fluid tank 104 will cause the pressure of the LNG 164 in the LNG supply tank 106 to rise. In general, when the pressure in the LNG supply tank 106 becomes too high (e.g., greater than approximately 4 psi which is typically the maximum transport pressure for LNG systems), the LNG supply tank 106 will require venting (i.e., releasing some LNG 164 to reduce the pressure in the LNG supply tank 106). In order to limit or eliminate the amount of venting of LNG 164 into the outside environment, an optional regulator 302 (i.e., a venting device) and gaseous natural gas ("GNG") device 304 may be included in the RBTC System 100 such that when the pressure in the LNG supply tank 106 becomes too high, the optional regulator 302 (initially shown in the closed position) is switched to an open position and the part of the LNG 164 is vented into the GNG device 304 to reduce the pressure of the LNG supply tank 106. In this way, the vented LNG 164 may be utilized to generate useful work with the GNG device 304. Examples of the GNG device 304 may include a fuel cell or an auxiliary power unit ("APU"). Utilizing the GNG device 304, the vented LNG 164 may be converted into steam, water, and $CO_2$ gas. Furthermore, if the optional heat-exchanger 114 is present, the heat-exchange 114 optional fluid path 166 is in fluid communication with the GNG device 304 via the optional regulator 302. In this example, the heat-exchanger cooling fluid (i.e., the LNG 164 passing through the optional heat-exchanger 114 and optional fluid path 166) may be vented LNG 164 (i.e., GNG) passing to GNG device 304 through the optional regulator 302. As such (and as discussed earlier), the addition of the optional heat-exchanger 114 running the vented LNG flow to the optional regulator 302 will remove heat from the cryogenic fluid 124 flowing back to the cryogenic fluid tank 104. The resulting heat removed from the returning cryogenic fluid 124 and added to the vented LNG 164 will warm the vented LNG 164 that is passed to the GNG device 304 allowing for more energy to be produced by the GNG device 304.

In this example, the optional heat-exchange 114 optional fluid path 166 is shown in fluid communication with the GNG device 304 via the optional regulator 302 separate from the LNG return line 146; however, it is noted that the optional heat-exchanger 114 may be located before the SV1 148 closer to the LNG storage tank 102 and, in this example, the optional fluid path 166 may be the LNG return line 146.

Once the LNG storage tank 102 is at approximately the same or lower temperature than the LNG 164 in the LNG supply tank 106, the cryogenic fluid 124 within the tank cavity 126 (of the LNG supply tank 106) is removed so as to introduce the LNG 164 from the LNG supply tank 106 into the tank cavity 126. This may be done by venting the cryogenic fluid 124 in the tank cavity 126 directly into the environment or by including additional valves (not shown) and an optional additional compressor (not shown) that isolate the fluid path of the cryogenic fluid 124 from the cryogenic fluid tank 104 to the inner cavity 130 of the optional cooling shell 112 from the fluid path of the LNG 164 from the LNG supply tank 106 to the tank cavity 126. In the situation where the two fluid paths of the cryogenic fluid 124 and LNG 164 are isolated from each other, the cryogenic fluid 124 may continue to flow through the inner cavity 130 (of the optional cooling shell 112) to help cool the LNG storage tank 102. In this example a temperature sensor (not shown) may be connected to the LNG storage tank 102 for determining the temperature of the LNG storage tank 102. Additionally, if cryogenic fluid 124 is still flowing through the inner cavity 130, the optional heat-exchanger 114 may continue to cool the returning cryogenic fluid 124 to the cryogenic fluid tank 104.

Figure 4:
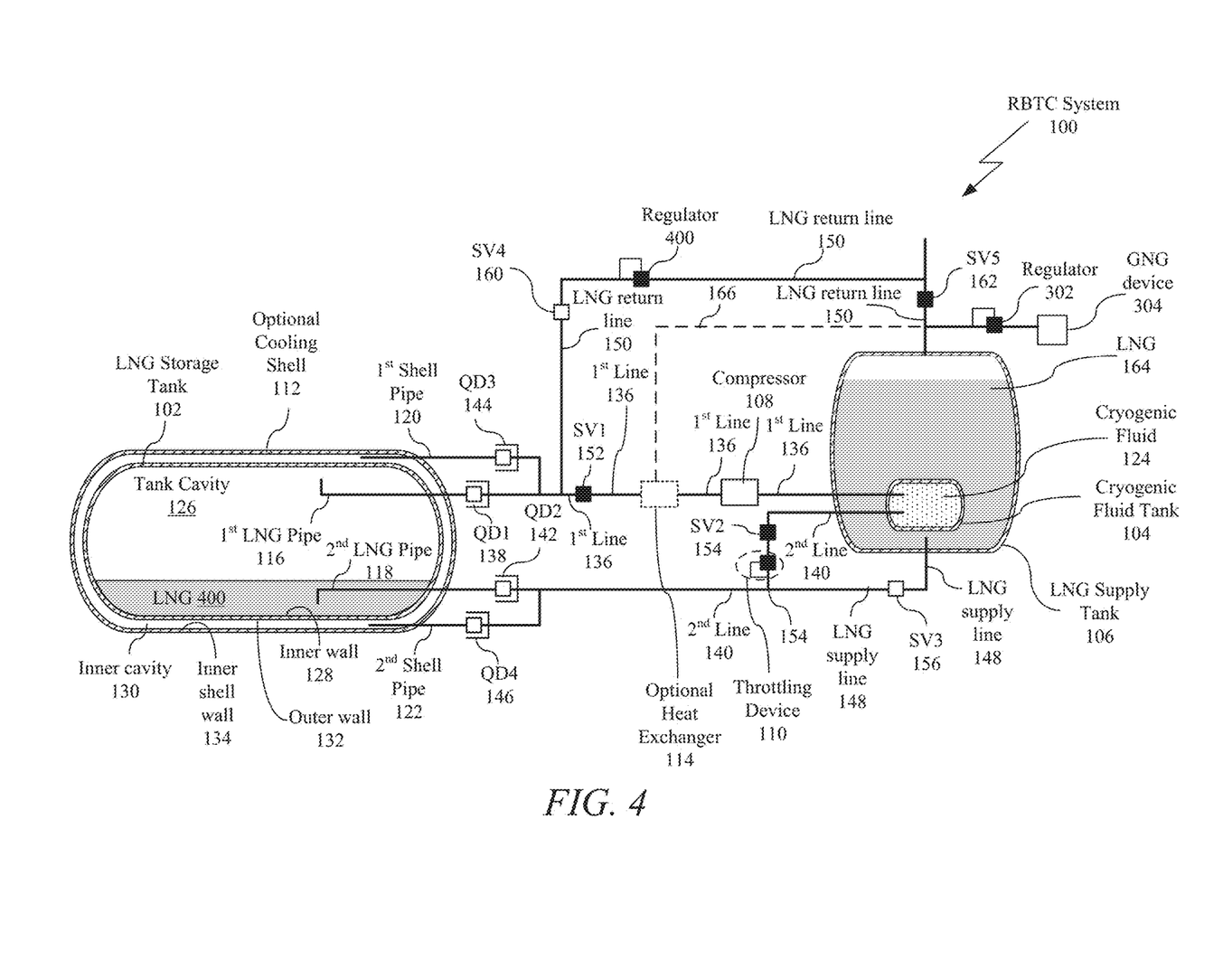
FIG. 4 is a system block diagram of the implementation of the RBTC System, shown in FIGS. 1 through 3, while in another phase of operation in accordance with the present disclosure.

In FIG. 4, a system block diagram is shown of the implementation of the RBTC System 100, shown in FIGS. 1 through 3, while in another phase of operation. In this example, the LNG storage tank 102 has been already been cooled to a temperature equal to or less than the temperature of the LNG 164 within the LNG supply tank 106. At this point, the cryogenic fluid 124 from the tank cavity 126 (and optionally the inner cavity 130) may be vented. Once the cryogenic fluid 124 have been vented from tank cavity 126, SV1 152, SV2 154 and the throttling device 110 are switched to the off position and SV3 156 and SV4 160 are switched to the open position. In general, SV4 160 is placed in an open position to prevent over-pressure build up within the tank cavity 126 and SV5 162 may also be optionally switched to the open position to capture any over-filled LNG 164 in the LNG supply tank 106.

Once SV2 154 is in a closed (i.e., off) position and SV3 156 is in an open position, the LNG 164 from the LNG supply tank 106 will flow into the tank cavity 126 through the LNG supply line 148, SV3 156, second line 140, QD2 142, and second LNG pipe 118 to accumulate in the tank cavity 126 as LNG 400 within the LNG storage tank 102. Unlike, the cryogenic fluid 124 shown in FIGS. 1 through 3, the LNG 400 will not flow back into the LNG supply tank 106 except for some leakeage. In this example, the LNG 164 from the LNG supply tank 106 will flow into the tank cavity 126 filling the tank cavity 126 with the LNG 400 until the tank cavity 126 is full. In this example, LNG 400 will not boil-off because the tank cavity 126 has be pre-chilled (i.e., cooled) by the cryogenic fluid 124 to a temperature that is equal to or below the temperature of the LNG 164 in the LNG supply tank 106. In this example, an optional back-pressure regulator 400 (e.g., a second regulator) may be added downstream of SV4 160 to maintain the system pressure of the RBTC System 100 above the vapor pressure as an additional method for preventing the LNG 400 from venting. Once the tank cavity 126 is full, SV3 156 and SV4 160 are switched to the closed position and the LNG storage tank 102 is filled with LNG 400 with little to no boil-off.

Figure 5:
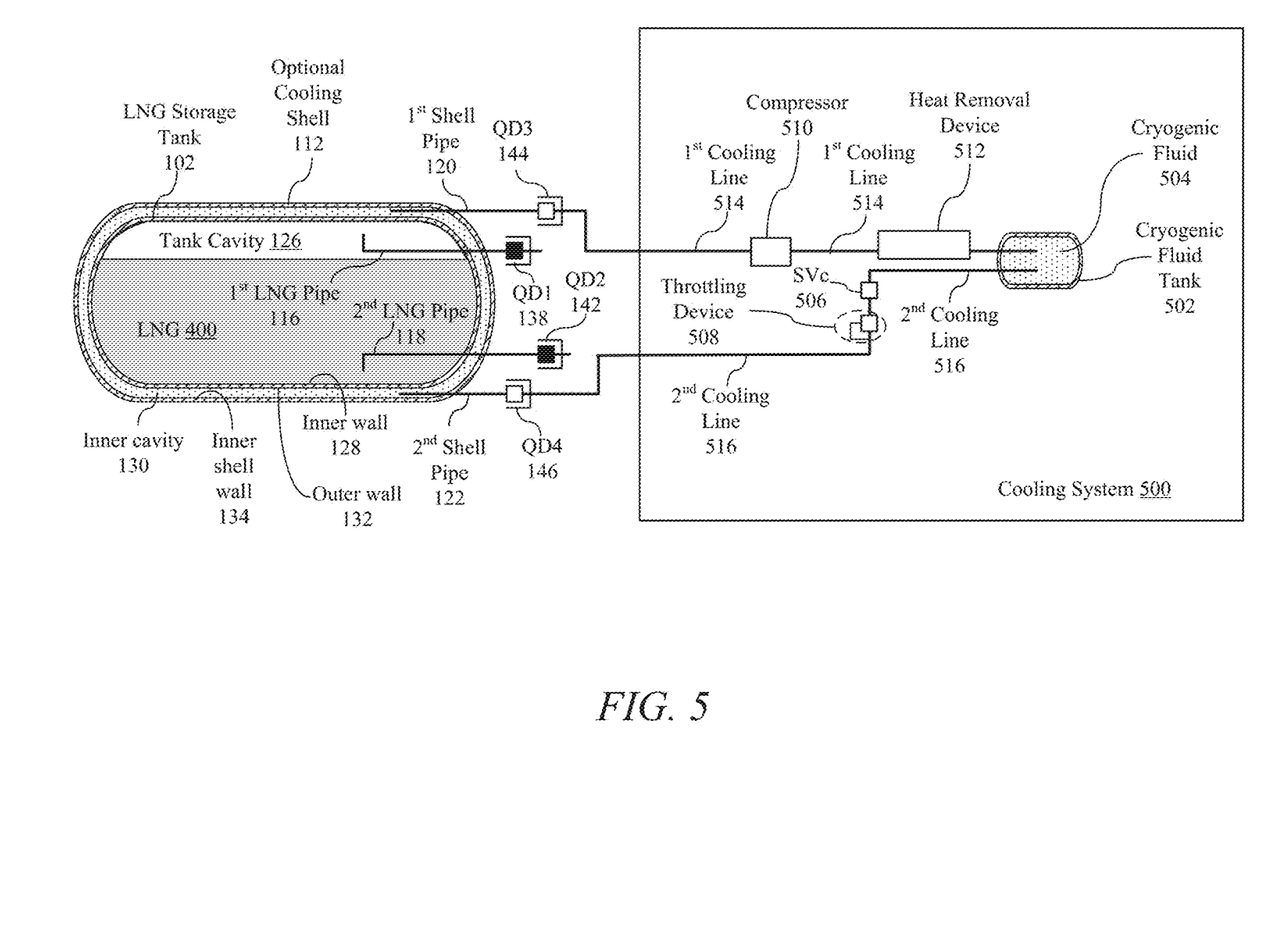
FIG. 5 is a system block diagram of an example of an implementation of a cooling system for maintaining the LNG within the LNG storage tank (shown in FIGS. 1 through 4) at a low temperature to prevent boil-off of the LNG in accordance with the present disclosure.

Turning to FIG. 5, in FIG. 5, a system block diagram is shown of an example of an implementation of a cooling system 500 for maintaining the LNG 400 within the LNG storage tank 102 (shown in FIGS. 1 through 4) at a low temperature to prevent boil-off of the LNG 400. As described earlier, additional valves and components may be added to the RBTC System 100 to allow the cryogenic fluid 124 to flow through the inner cavity 130 to help maintain the temperature of the LNG storage tank 102 low enough to prevent boil-off. However, in this example, the cooling system 500 may be part of the RBTC System 100 (i.e., part of the implementation described earlier) or a separate cooling system 500. In this example, the separate cooling system 500 is in fluid communication with the inner cavity 130 of the optional cooling shell 112 via QD3 144 and QD4 146 in order to establish a closed system between the inner cavity 130 and a cryogenic fluid tank 502 in the cooling system 500. Furthermore, in this example, QD1 138 and QD2 142 are in a closed position to not allow the LNG 400 within the tank cavity 126 to escape. In this manner, cryogenic fluid 504 within the cryogenic fluid tank 502 is configured to flow through the cooling system 500 and inner cavity 130 of the optional cooling shell 112 keeping the temperature of the LNG storage tank 102 at approximately the LNG 400 temperature or below during idle times that the LNG 400 is not utilized. The cooling system 500 may include a cryogenic fluid tank 502 (that is full of cryogenic fluid 504 such as, for example, GN2), a cooling system valve ("SVc") 506, throttling device 508 (which may be a regulator), compressor 510, and heat removal device 512. The compressor 510 and heat removal device 512 are in fluid communication with the cryogenic fluid tank 502 and QD3 144 via a first cooling line 514 and the SVc 506 and throttling device 508 are in fluid communication with the cryogenic fluid tank 502 and QD4 146 via a second cooling line 516. As mentioned earlier, if the cooling system 500 is part of the RBTC System 100, the first cooling line 514, compressor 510, and cryogenic fluid tank 502 are correspondingly the first line 136, compressor 108, and cryogenic fluid tank 104. Similarly, the second cooling line 516, regulator 508, and SVc 506 are correspondingly the second line 140, throttling device 110, and SV2 154. In the case of an independent cooling system 500, the compressor 510 is a device that increases the pressure of the returning cryogenic fluid 504 from the inner cavity 130 and forces it into the cryogenic fluid tank 502. The heat removal device 512 may be, for example, heat-exchanger, a refrigerator, liquid nitrogen ("$LN_2$") bath, LNG bath, storage dewar of LNG, cryo-cooler, Joules-Thompson device, etc.

In an example of operation, the cryogenic fluid 504 is initially stored at LNG temperature and when SVc 506 is in an open position, the cryogenic fluid 504 will flow into the LNG storage tank 102 through SVc 506, the throttling device 508, second cooling line 516, QD4 146, the second shell pipe 122, and the inner cavity 130 of the LNG storage tank 102. Then the cryogenic fluid 504 will flow out of the inner cavity 130 and back to the cryogenic fluid tank 502 through the first shell pipe 120, QD3 144, first cooling line 514, compressor 510, and heat removal device 512. In this example, the temperature of the cryogenic fluid 504 will be lower than the LNG 400 temperature (i.e., the boiling point of GN2 is approximately −195.8° C.) and the cryogenic fluid 504 is circulated through the inner cavity 130 and back to the cryogenic fluid tank 502 with the aid of the compressor 510. Since this process tends to increase the temperature of the cryogenic fluid 504, the cryogenic fluid 504 is cooled to approximately the LNG temperature prior to entering the cryogenic fluid tank 502 with the heat removal device 512. This process continues for as long as needed to help maintain the LNG 400 at a temperature that prevents boil-off.

Figure 6:
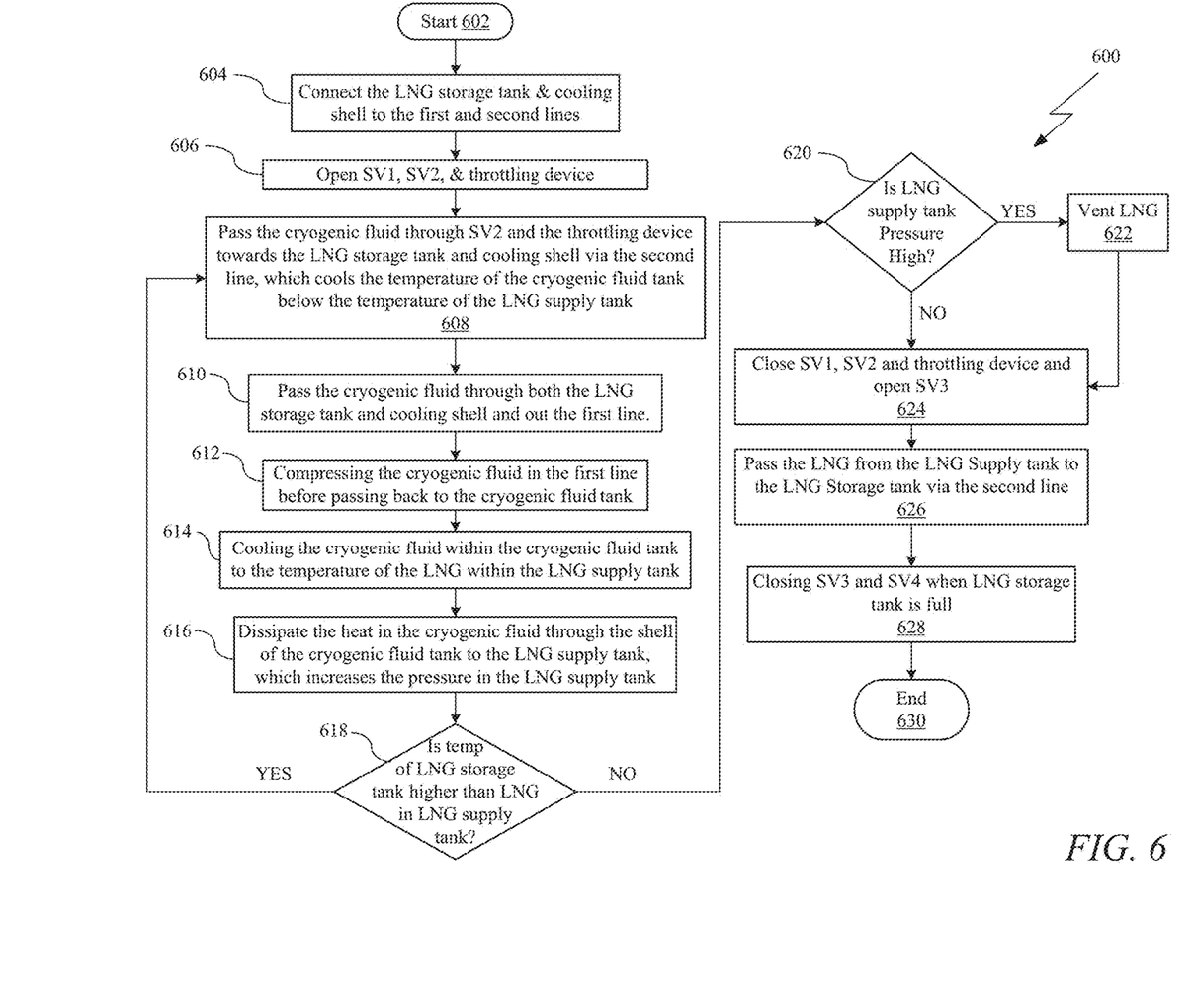
FIG. 6 is a flowchart of an example of an implementation of process performed by the RBTC System, shown in FIGS. 1 through 4, in accordance with the present disclosure.

In FIG. 6, a flowchart 600 is shown of an example of an implementation of process performed by the RBTC System 100 (shown in FIGS. 1 through 4) in accordance with the present disclosure. In this example, the process starts 602 by connecting the LNG storage tank 102 and optional cooling shell 112 to the first and second lines 136 and 140, respectively, in step 604. This includes connecting the first LNG pipe 116 and first shell pipe 120 to the first line 136 via QD1 138 and QD3 144, respectively, and connecting the second LNG pipe 118 and second shell pipe 122 to the second line 140 via QD4 146 and QD2 142, respectively. This also assumes that all the values SV1 152, SV2 154, SV3 156, SV4 160, and SV5 162 and throttling device 110 are initially in the closed positon so that neither the cryogenic fluid 124 or LNG 164 vent from the cryogenic fluid tank 104 or LNG supply tank 106.

The SV1 152, SV2 154, and throttling device 110 are then switch to an open position in step 606 and the cryogenic fluid 124 begins to flow through the SV2 154 and throttling device 110 towards the LNG storage tank 102 and optional cooling shell 112 via the second line 140 in step 608, which cools the temperature of the cryogenic fluid tank 104 below the temperature of the LNG 164 within the LNG supply tank 106. The cryogenic fluid 124 then passes through both the tank cavity 126 of the LNG storage tank 102 and the inner cavity 130 of the LNG storage tank 102 and optional cooling shell 112 in step 610. This results in both the LNG storage tank 102 and optional cooling shell 112 cooling below the initial ambient temperature to a temperature approximately equal to the temperature of the cryogenic fluid 124, which is approximately equal to or below the LNG 164 temperature. The cryogenic fluid 124 then leaves the tank cavity 126 and inner cavity 130 and flows to back to the cryogenic fluid tank 104 via the first line 136. The returning cryogenic fluid 124 on the first line 136 is then compressed by the compressor 108 (which increases the pressure of the cryogenic fluid 124) before being forced back into the cryogenic fluid tank 104 in step 612. The compressed cryogenic fluid 124 then flows back into the cryogenic fluid tank 104, which increases the temperature of the cryogenic fluid 124 within the cryogenic fluid tank 104. In step 614, the resulting increase in temperature of the cryogenic fluid tank 104 is cooled to a temperature that is approximately the temperature of the LNG 164 within the LNG supply tank 106. In cooling the cryogenic fluid tank 104, the heat 300 from the cryogenic fluid 124 is dissipated through thermal conduction into LNG supply tank 106 via the shell of the cryogenic fluid tank 104 in step 616. This dissipated heat 300 increase the temperature of the LNG 164 within the LNG supply tank 106, which correspondingly increases the pressure within the LNG supply tank 106. In decision step 618, if the temperature of the LNG storage tank 102 is still higher than the temperature of the LNG 164 within the LNG supply tank 106, the process returns to step 608 and the sub-process repeats (i.e., steps 608 through 618) until the temperature of the LNG storage tank 102 is approximately equal to or less than the temperature of the LNG 164 within the LNG supply tank 106.

If, instead, the temperature of the LNG storage tank 102 is approximately equal to or less than the temperature of the LNG 164 within the LNG supply tank 106, the process continues to decision step 620. In decision step 620, if the resulting LNG supply tank 106 pressure is too high (e.g., a predetermined pressure value that may be, for example, approximately 4 psi), the LNG supply tank 106 is vented in step 622 and the process continues to step 624. The venting step 622 may include utilizing GNG device 304 as described earlier in this disclosure.

If, instead, the resulting LNG supply tank 106 pressure is not too high, the process continues to step 624 where the valves SV1 152 and SV2 154 and throttling device 110 are switched to the closed position preventing further amounts of cryogenic fluid 124 to flow from the cryogenic fluid tank 104 into the tank cavity 126. In this example, the supply of cryogenic fluid 124 to the inner cavity 130 may optionally also be shut off or continued to help keep the LNG storage tank 102 cool. Once the flow of cryogenic fluid 124 has been shut off from the cryogenic fluid tank 104, the remaining cryogenic fluid within the tank cavity 126 of the LNG storage tank 102 may be vented out of the system by various known techniques which are known to those of ordinary skill in the art. Once the cryogenic fluid 124 have been vented from the tank cavity 126, in step 624, the valve SV3 is open causing the LNG 164 in the LNG supply tank 106 to flow out of the LNG supply tank 106 towards the tank cavity 126 via the LNG supply line 148, SV3 156, second line 140, QD2 142, and second LNG pipe 118 in step 626.

The valve SV4 160 and a second regulator downstream may be switched to open position to keep the system pressure above the vapor pressure so as to prevent GNG from venting from the system. Once the tank cavity 126 of the LNG storage tank 102 is full, the valves SV3 156 and SV4 160 are switched to the closed position, in step 628, and the process ends 630.

As discussed earlier in this disclosure that the while $GN_2$ was utilized as an example in this disclosure, it is again appreciated by those of ordinary skill in the art that examples given and described also may include utilizing other types of cryogenic fluids instead of GN2 that include, for example, $CO_2$, $N_2O$, Ar, He, $H_2$, $O_2$, $CH_4$, etc. Again, for purposes of simplicity, in this disclosure the cryogenic fluid was chosen to be cryogenic fluid 124 and the cryogenic tank was chosen to be a cryogenic fluid tank 104. However, it is again appreciated by those of ordinary skill in the art that other cryogenic gas could also have utilized without departing from the spirit of this disclosure.

It will be understood that various aspects or details of the implementations may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure.

What is claimed is:

1. A thermal conditioning system for transferring liquid natural gas from a liquid natural gas supply tank to a liquid natural gas storage tank, wherein the liquid natural gas storage tank has a first liquid natural gas pipe and a second liquid natural gas pipe, the thermal conditioning system comprising:
   a cryogenic fluid tank within the liquid natural gas supply tank, wherein the cryogenic fluid tank is configured to store a cryogenic fluid within the cryogenic fluid tank, and wherein the first liquid natural gas pipe and the second liquid natural gas pipe are in fluid communication with the cryogenic fluid tank;
   a compressor, wherein the compressor is in fluid communication with the cryogenic fluid tank via the first liquid natural gas pipe;
   a throttling device, wherein the throttling device is in fluid communication with the cryogenic fluid tank via the second liquid natural gas pipe;
   a cooling shell surrounding the liquid natural gas storage tank having:
   a first shell pipe; and
   a second shell pipe, wherein the first shell pipe and second shell pipe are in fluid communication with the cryogenic fluid tank, and wherein the first shell pipe, the second shell pipe, and the compressor are configured such that in operation the cryogenic fluid, from the cryogenic fluid tank, enters the cooling shell via the second shell pipe and leaves the cooling shell via the first shell pipe; and
   a first line; and
   a second line, wherein the first line is in fluid communication with the first liquid natural gas pipe, the first shell pipe, the compressor, and the cryogenic fluid tank, and wherein the second line is in fluid communication with the second liquid natural gas pipe, the second shell pipe, the throttling device, and the cryogenic fluid tank.

2. The thermal conditioning system of claim 1, wherein the cooling shell is configured to cool the liquid natural gas storage tank to a first temperature lower than a second temperature of the liquid natural gas within the liquid natural gas supply tank.

3. The thermal conditioning system of claim 1, wherein the throttling device is configured to reduce a pressure of the cryogenic fluid as the cryogenic fluid passes through the throttling device.

4. The thermal conditioning system of claim 1, wherein the first liquid natural gas pipe, the first line, and the compressor faun a first fluid path between the cryogenic fluid tank and a tank cavity of the liquid natural gas storage tank, and wherein the second liquid natural gas pipe and the second line form a second fluid path between the cryogenic fluid tank and the tank cavity.

5. The thermal conditioning system of claim 4, wherein the first line includes a first valve, wherein the second line includes a second valve and the throttling device, wherein the first valve is configured to have an first open position and a first closed position, wherein the second valve is configured to have a second open position and a second closed position, wherein the second valve is configured to allow the cryogenic fluid to enter the tank cavity via the second liquid natural gas pipe while the second valve is in the second open position, and wherein the first valve is configured to allow the cryogenic fluid to leave the tank cavity via the first liquid natural gas pipe while the first valve is in the first open position.

6. The thermal conditioning system of claim 5, wherein the second valve is configured to allow the cryogenic fluid to enter the cooling shell via the second shell pipe while the second valve is in the second open position, and wherein the first valve is configured to allow the cryogenic fluid to leave the cooling shell via the first shell pipe while the first valve is in the first open position.

7. The thermal conditioning system of claim 6, further comprising:
  a liquid natural gas supply line in fluid communication with the liquid natural gas supply tank and the liquid natural gas storage tank, and
  a liquid natural gas return line in fluid communication with both the liquid natural gas supply tank and the liquid natural gas storage tank.

8. The thermal conditioning system of claim 7, wherein the cryogenic fluid tank is configured to transfer heat from the cryogenic fluid in the cryogenic fluid tank to the liquid natural gas within the liquid natural gas supply tank.

9. The thermal conditioning system of claim 8, wherein the first liquid natural gas pipe includes a first quick disconnect fitting, wherein the second liquid natural gas pipe includes a second quick disconnect fitting, wherein the first shell pipe includes a third quick disconnect fitting, and wherein the second shell pipe includes a fourth quick disconnect fitting.

10. The thermal conditioning system of claim 9, further comprising:
  a third valve in fluid communication with the liquid natural gas supply line; and
  a fourth valve in fluid communication with the liquid natural gas return line.

11. The thermal conditioning system of claim 10, further comprising a venting device in fluid communication with the liquid natural gas supply tank, wherein the venting device is configured to vent the liquid natural gas supply tank responsive to the heat from the cryogenic fluid tank creating pressure within the liquid natural gas supply tank that satisfies a pressure threshold value.

12. The thermal conditioning system of claim 11, further comprising a heat-exchanger in fluid communication with the first line, the compressor, and the venting device, wherein the heat-exchanger is configured to transfer the heat from the cryogenic fluid to the venting device.

13. The thermal conditioning system of claim 12, wherein the cryogenic fluid is gaseous nitrogen and the cryogenic fluid tank is a gaseous nitrogen tank.

14. The thermal conditioning system of claim 1, further comprising:
  a venting device in fluid communication with the liquid natural gas supply tank; and
  a heat-exchanger in fluid communication with the venting device, wherein the first line is in fluid communication with the first liquid natural gas pipe, the heat-exchanger, the compressor, and the cryogenic fluid tank, and wherein the second line is in fluid communication with the second liquid natural gas pipe, the throttling device, and the cryogenic fluid tank.

15. The thermal conditioning system of claim 14, further comprising:
  a liquid natural gas supply line in fluid communication with the liquid natural gas supply tank and the liquid natural gas storage tank;
  a liquid natural gas return line in fluid communication with both the liquid natural gas supply tank and the liquid natural gas storage tank;
  a first valve in fluid communication with the first line;
  a second valve in fluid communication with the second line;
  a third valve in fluid communication with the liquid natural gas supply line; and
  a fourth valve in fluid communication with the liquid natural gas return line.

16. A method for thermal conditioning during transfer of liquid natural gas from a liquid natural gas supply tank to a liquid natural gas storage tank using a thermal conditioning system that includes the liquid natural gas storage tank, and a cryogenic fluid tank within the liquid natural gas supply tank, the method comprising:
  passing a cryogenic fluid, from the cryogenic fluid tank, to the liquid natural gas storage tank via a throttling device and a second line in fluid communication with the liquid natural gas storage tank, wherein a portion of the cryogenic fluid passes into a cooling shell surrounding the liquid natural gas supply tank via a second shell pipe in fluid communication with the second line:
  passing the cryogenic fluid, from the liquid natural gas storage tank, to the cryogenic fluid tank via a compressor and a first line in fluid communication with the cryogenic fluid tank, wherein the portion of the cryogenic fluid passes into the first line from the cooling shell via a first shell pipe in fluid communication with the first line:
  cooling the liquid natural gas storage tank to a particular temperature equal to or below a first temperature of liquid natural gas within the liquid natural gas supply tank; and
  passing the liquid natural gas from the liquid natural gas supply tank to the liquid natural gas storage tank.

17. The method of claim 16, wherein cooling the liquid natural gas storage tank includes cooling the cooling shell to a second temperature of the liquid natural gas storage tank equal to or below the first temperature of the liquid natural gas within the liquid natural gas supply tank, and wherein passing the cryogenic fluid from the cryogenic fluid tank to the liquid natural gas storage tank and the cooling shell comprises:

heating the cryogenic fluid within the cryogenic fluid tank; and     heating the liquid natural gas within the liquid natural gas supply tank via heat conduction of heat from the cryogenic fluid in the cryogenic fluid tank to the liquid natural gas, wherein heating the liquid natural gas increases a pressure of the liquid natural gas within the liquid natural gas supply tank.

18. The method of claim 17, further comprising determining whether the second temperature of liquid natural gas storage tank is equal to or below the first temperature of the liquid natural gas within the liquid natural gas supply tank, wherein passing the liquid natural gas from the liquid natural gas supply tank to the liquid natural gas storage tank includes passing the liquid natural gas from the liquid natural gas supply tank to the liquid natural gas storage tank responsive to the second temperature of liquid natural gas storage tank being equal to or below the first temperature of the liquid natural gas within the liquid natural gas supply tank.

19. The method of claim 18, wherein the portion of the cryogenic fluid is passed from the cryogenic fluid tank to the cooling shell while the liquid natural gas storage tank is full of liquid natural gas.

20. The method of claim 19, wherein the cryogenic fluid is gaseous nitrogen and the cryogenic fluid tank is a gaseous nitrogen tank.

* * * * *